Dec. 27, 1960          J. VAN ACKEREN          2,966,394

METHOD AND APPARATUS FOR PRODUCING AMMONIUM SULFATE

Filed Aug. 21, 1957          4 Sheets-Sheet 2

INVENTOR.
JOSEPH VAN ACKEREN.

BY Oscar B. Brumbark his ATTORNEY.

Dec. 27, 1960  J. VAN ACKEREN  2,966,394
METHOD AND APPARATUS FOR PRODUCING AMMONIUM SULFATE
Filed Aug. 21, 1957  4 Sheets-Sheet 3

INVENTOR.
JOSEPH VAN ACKEREN.
BY
Oscar B Brumback
his ATTORNEY.

Dec. 27, 1960     J. VAN ACKEREN     2,966,394
METHOD AND APPARATUS FOR PRODUCING AMMONIUM SULFATE
Filed Aug. 21, 1957                     4 Sheets-Sheet 4

INVENTOR.
JOSEPH VAN ACKEREN
BY
Drew B Brumbaugh
his ATTORNEY.

United States Patent Office 2,966,394
Patented Dec. 27, 1960

2,966,394
METHOD AND APPARATUS FOR PRODUCING AMMONIUM SULFATE

Joseph Van Ackeren, Pittsburgh, Pa., assignor to Koppers Company, Inc., a corporation of Delaware Filed Aug. 21, 1957, Ser. No. 679,391
12 Claims. (Cl. 23—119)

This invention relates generally to the recovery of ammonia from coke oven gas.

During the carbonization of coal, as in coke plants, five to six pounds of ammonia are usually produced per ton of coal. This ammonia generally constitutes two to three percent of the gas evolved and, because of the corrosive action of the ammonia on the valves, fittings and lines, must be removed from the gas. This ammonia is usually removed by treating the gas with a solution having two to eight percent free sulfuric acid and the resulting ammonium sulfate is recovered by crystallization of the salt from the solution. This by-product ammonium sulfate is sold as a fertilizer.

A major factor in the economics of the recovery of ammonia from coke oven gas has been the operating and maintenance costs involved in the handling of the large volumes of gas and liquids. A novel process and apparatus has now been found according to this invention whereby operating costs may be lowered through efficient absorption of the ammonia from the gas by a solution which contains free sulfuric acid and which is maintained unsaturated as to its content of ammonium sulfate so that an optimum absorption activity of the solution is maintained and, in the preferred embodiment, through the use of the deammoniated gas as a stripping agent to remove the water from the resulting ammonium sulfate solution. It has also been found according to this invention that it is possible to control more closely the crystal size and quality through the addition of ammonia to the ammonium sulfate solution in the crystallizer as crystals are being formed. A further advantage is that the portions of the equipment where supersaturation of the solution exists are minimized, thereby decreasing the tendency for undesirable local supersaturation and production of small rock crystals.

Briefly stated, the invention comprises flowing coke oven gas containing ammonia from the coke oven, separating an aqueous condensate containing a portion of the ammonia from the gas, and distilling the condensate to obtain a concentrated stream of ammonia and water vapor, thereafter contacting the coke oven gas containing the remaining ammonia with an aqueous sulfuric acid solution unsaturated in respect of ammonium sulfate to remove such ammonia from the gas, evaporating moisture from the so-enriched acid solution to supersaturate the solution in respect of the ammonium sulfate, and passing this supersaturated solution through a slurry of ammonium sulfate crystals to desupersaturate the solution by further crystal formation, while, at the same time, introducing the said concentrated stream of ammonia and water vapor into the slurry so as to absorb this ammonia and precipitate it as ammonium sulfate upon the crystals therein.

It has been found in accordance with this invention that crystals of controllable desired size and uniform quality can be produced from coke oven gas by a novel process wherein the gas from the coke oven is cooled to remove tar, water, and other impurities from the gas, thereafter the gas is contacted with an aqueous solution which contains free sulfuric acid and is unsaturated with respect to its content of ammonium sulfate to deammoniate the gas or remove the ammonia therefrom, then the deammoniated gas is contacted with a heated solution of ammonium sulfate whereby the gas strips moisture from the latter solution thereby causing the solution to reach a supersaturated condition; the above-mentioned condensate from the gas then has the ammonia removed therefrom, and this latter ammonia and the supersaturated solution are flowed through a bed of previously formed crystals, whereby the solution is desupersaturated and large crystals of controlled size are produced.

The above and other objects and novel features of the present invention will appear more fully from the following detailed description when the same is read in connection with the accompanying drawings. It is to be expressly understood, however, that the drawings are not intended as a definition of the invention but are for the purpose of illustration only.

In the drawings wherein like parts are marked alike:

Figure 1 schematically illustrates an apparatus for carrying out the invention;

Figure 1:
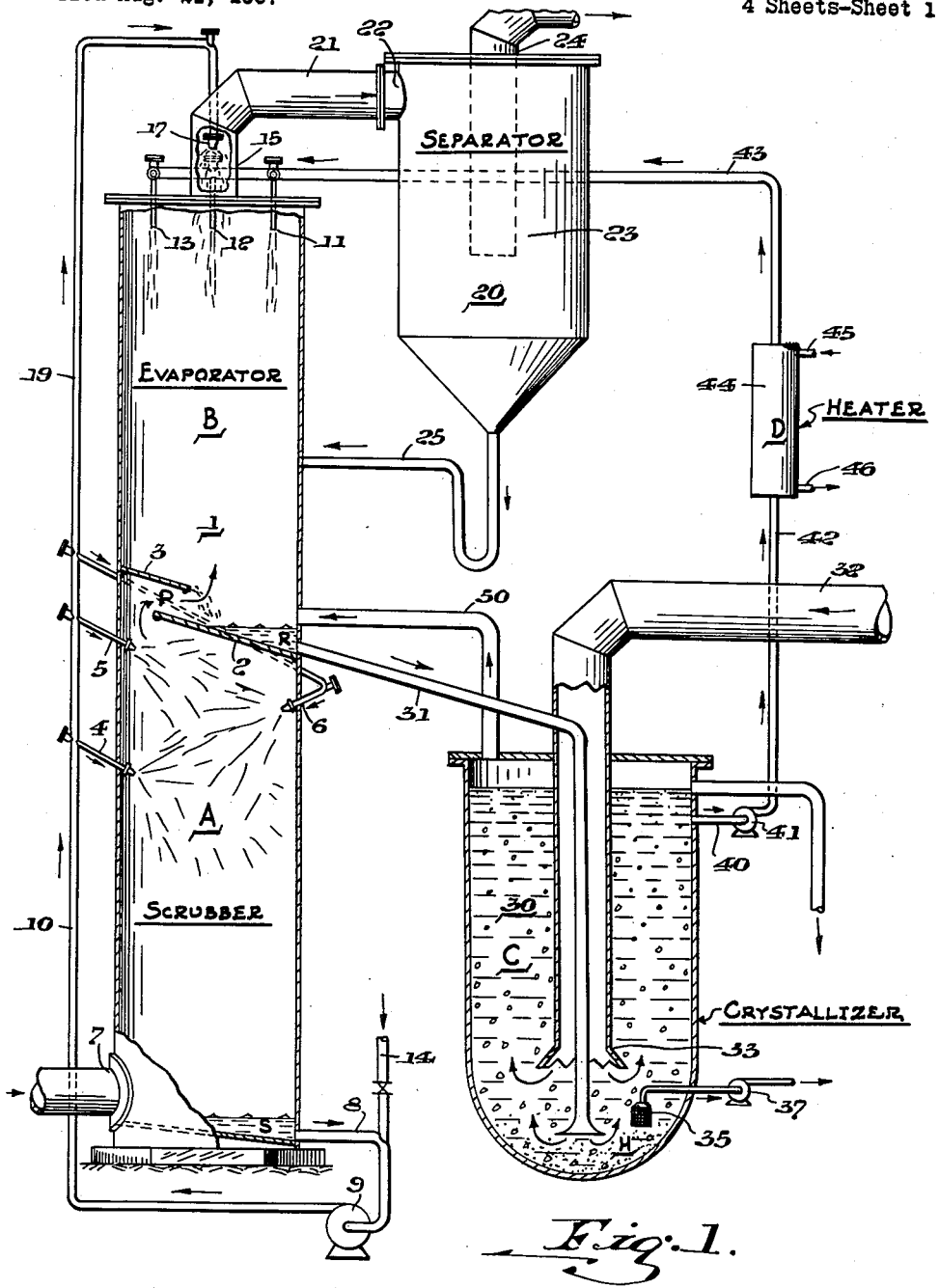

The process of the invention may advantageously be carried out in the novel apparatus illustrated generally in Figure 1 as a scrubbing zone A, an evaporation zone B, a crystallizer C, and a heating zone D. Zones A and B are conveniently the sections of a closed tower 1 formed by a pair of transversely extending baffles 2 and 3. These baffles are spaced to provide a gas passage P and are slanted so that solution drains from baffle 3 to baffle 2 and the upper side of baffle 2 and the side wall of the tower provide a reservoir R for solution. These baffles are advantageously placed at the upper two thirds of the height of the tower.

The open space of section A constitutes a scrubbing zone for the gas which enters this section at inlet 7. As the gas passes upwardly through section A to gas passage P, it contacts a dense concentration of the spray droplets of solution provided by the plurality of spray units 4, 5 and 6. This contact is sufficient to remove the ammonia constituent from the gas or deammoniate the gas, and these droplets with the ammonia absorbed therein collect in a pool S at the bottom of section A. The solution flows from pool S through line 8 to a pump 9 which forces the solution through line 10 to spray units 4, 5 and 6. The acid and water are added at line 14. Sufficient acid is added here for the entire system; and sufficient water is added to maintain the solution in unsaturated condition with respect to its ammonium sulfate content after the ammonia has been absorbed therein. Due to the acid nature of the solution, the solution efficiently removes the ammonia from the gas.

Section B constitutes an evaporating zone. A heated solution of ammonium sulfate is introduced into the top of the evaporating zone by means of sprays 11, 12 and 13, falls downwardly through the evaporating zone to engage baffle plates 2 and 3; any solution which engages baffle plate 3 flows to baffle plate 2 and collects at reservoir R. As these droplets contact the gas flowing from passageway P to outlet 15 the gas is heated and strips moisture from the droplets. Although the gas has reached a saturation condition with respect to its humidity at the temperature of the solution present in scrubbing zone A, the temperature of the solution in evaporating zone B is substantially higher so that the gas can hold a greater amount of moisture; and the gas evaporates moisture from the droplets; thereby bringing the solution at reservoir R to a supersaturated state (due to the height of reservoir R above crystallizer C, little solution actually remains there). To control the extent of supersaturation of the solution at reservoir R and to provide new solution for the evaporating zone, solution from pool S is added at spray unit 17 in outlet 15 by way of lines 10 and 19. This addition of new solution at outlet 15 prevents a carry-over of saturated solution from evaporating zone B and removes solution from pool S at the rate at which solution is added at line 14.

Sprays 4, 5 and 6 are advantageously of the type which give fine spray droplets for intimately contacting the solution with the gas to absorb the ammonia therefrom. Sprays 11, 12, 13 and 17 on the other hand are advantageously of the type which give large droplets of solution for the evaporation of moisture therefrom without causing small crystals. It has also been found advantageous to shower about five times as much solution through the smaller evaporating zone B as through the larger scrubbing zone A during a given period of time as this makes the most effective use of material and space.

A separator 20 may be provided for conduit 21 to prevent any liquid from being carried over by entrainment to subsequent processing apparatus. This may be a conventional separator wherein the gas enters tangentially at inlet 22 and spirals downwardly to flow up flue 23 and leave at outlet 24. The centrifugal force due to the spiraling of the gas hurls any entrained droplets against the side of separator 20. This solution drains downwardly and returns through conduit 25 to the evaporating zone B. Thus, the gas leaving outlet 24 is substantially free of entrained liquids and ammonia and may be further processed as desired.

The supersaturated solution from reservoir R flows through line 31 to the bottom of crystallizer C, impinges on the lower, rounded portion of the crystallizer, and flows upwardly through a bed H of previously formed crystals. At the same time ammonia is fed through conduit 32 and a conventional "cracker" pipe arrangement 33 to the solution and the bed of crystals whereby the supersaturation of the solution flowing through line 31 is released in the bed of crystals H in the presence of additional ammonia. It has been found that by this arrangement large crystals of uniform size may be formed.

The upward flow of solution through the bed of crystals H tends to form a crystal gradient with the larger crystals at the bottom and the smaller crystal particles at the top. The large crystals near the bottom are removed by a suitable head 35 and pump 37 and sent to a suitable filter for drying and packaging; and the supernatant liquid and smaller crystals near the top are flowed from the upper portion of the crystallizer through line 40 to a pump 41 which forces the solution through lines 42 and 43 to sprays 11, 12 and 13. The solution may be heated by a conventional indirect heater 44 having a steam inlet 45 and outlet 46. This heating dissolves at least a portion of the fine crystals that may be present in the solution and secondly raises the temperature of the solution so that the heated solution released at sprays 11, 12 and 13 heats the gas passing through the evaporating zone whereupon the gas removes water from the solution. Any gases not absorbed or condensed in the crystallizer are vented by line 50 to the evaporating zone.

The foregoing has presented a novel arrangement for removing the ammonia constituent from a gas, for evaporating the water from ammonium sulfate and for forming crystals of controlled size in the presence of ammonia and in the presence of previously formed crystals. It is particularly adapted for the recovery of ammonia from coke oven gas as large crystals of ammonium sulfate.

Figure 2:
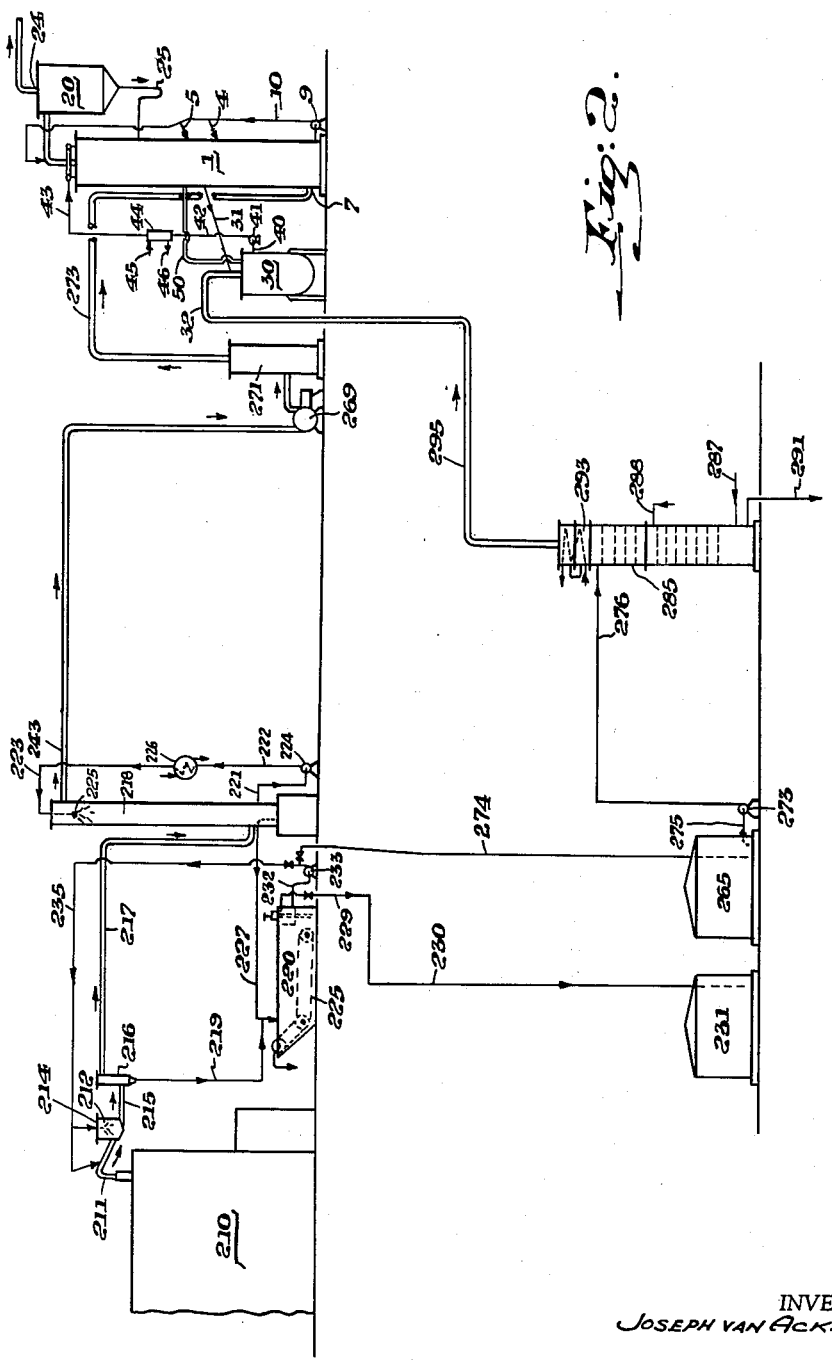
Figure 2 illustrates schematically the invention of Figure 1 incorporated in a complete system for the removal of the ammonia from coke oven gas and its recovery as crystals of ammonium sulfate.

Considering now Figure 2 for a complete system for the removal of ammonia from coke oven gas and incorporating the foregoing invention, the gas from coke oven battery 210 flows through an ascension pipe 211 to a collecting main 212. Here units 214 spray the gases with ammoniacal or flushing liquor, thereby cooling the gases to a temperature of about 80° C. and absorbing about 20 percent of the ammonia therefrom. Some tar also condenses at this temperature and collects along with the flushing liquor at the bottom of the collecting main 212. The gas and mixture of flushing liquor and tar flows along a conduit 215 to a downcomer 216 where the gas separates from the mixture of liquor and tar. Thereafter, the gas flows through a conduit 217 to a primary cooler 218, and the mixture of liquor and tar flows through a pipe 219 to a flushing liquor decanter 220.

The gas is cooled to about 35° C. in primary cooler 218 by contact with ammoniacal liquor which is recirculated by way of lines 221, 222 and 223, pump 224 and spray 225 and which is cooled by a conventional indirect cooler 226. More tar and water vapor condense out of the gas in cooler 218, and the excess liquid flows by way of line 227 to the line 219 which leads to decanter 220. The tar sinks to the bottom of the decanter and the ammonia liquor rises to the top. A drag conveyor 225, indicated by a dotted line, removes any coal and dust which settles to the very bottom of the decanter; lines 229 and 230 conduct tar from a point near the bottom of decanter 220 to a suitable tar storage tank 231 for sale or subsequent refining in a suitable tar processing plant (not shown); and line 232 conducts the ammonia liquor from the top of decanter 220 to pump 233.

Pump 233 circulates a major portion of the ammonia liquor through a line 235 back to sprays 214 to cool the hot gases from oven 210 and saturate the gases with water vapor; the unevaporated part of this portion may either drain directly to decanter 220 or travel, as entrainment, to the primary cooler 218 where it mixes with the condensates and is returned by line 227 to decanter 220. Pump 233 sends a minor portion of the flushing liquor, i.e., the excess condensate equivalent to the water distilled from the coal, through lines 274 to an ammonia liquor storage tank 265.

By way of duct 217, the coke oven gas enters into the lower portion of primary cooler 218 which may be of conventional type, i.e., a tall tower packed with horizontal layers of wooden "hurdles." The so-called "ammonia liquor" from sprays 225 at the top of the tower cascades over the packing to wash and cool the gas, thereby condensing water vapor and tar from the gas, and absorbing a portion of the ammonia. A decanter (not shown) in the bottom of primary cooler 218 makes a rough separation of the ammonia liquor and the tar: the tar and excess liquor flow through line 227 to decanter 220; and the ammonia liquor recirculates through line 221, pump 224, and cooler 226 to sprays 225.

The gas then flows from the top of primary cooler 218 to exhauster 269 (conventionally a large centrifugal compressor which creates the suction on the line from ascension pipe 243). The gas is compressed in exhauster 269 and sent to a conventional tar precipitator 271 where any tar which still remains in the gas is removed. The gas flows through duct 273 to a scrubber and evaporator of the type described as 1 above.

On the other hand, the flushing and cooling liquors which have collected in tank 265 usually contain 5 to 8 grams of total ammonia per liter of solution; the total ammonia usually being about 30 to 50 percent free ammonia (as carbonates, sulfides, cyanides and hydroxides) and 50 to 70 percent fixed ammonia (as chlorides and other fixed salts of ammonia). To purify the solution of tank 265 of phenols, the solution may be treated in a conventional dephenolizer (not shown) and then pumped to a conventional ammonia still such as still 285. In the embodiment of the invention illustrated herein, pump 273 forces liquor from tank 265 through lines 275 and 276 to ammonia still 285, where acid gases such as $H_2S$, $CO_2$ and HCN, are stripped from the liquor by steam which is introduced at the bottom of the still through line 287 before mixing with milk of lime which may be added by way of line 288 to this liquor, as it is being steam-stripped, to free the fixed ammonia therein. The waste liquor leaving through line 291 at the base of this still is substantially free of ammonia. Some dephlegmation is usually practiced at the top of the still by the use of cooling coils 293 to limit the steam content of the ammonia vapors flowing in line 295 to the crystallizer. The ammonia vapor flows to the crystallizer 30 of the type discussed above.

In the recovery of the ammonium sulfate, a portion (about 20 to 25 percent of the ammonia) is separated as aqueous condensate as the gas from the coke oven 210 is sprayed and cooled by cooling liquors at sprays 214 and 225. (This liquid cools the gas, removes many of the impurities and about 20 percent of the ammonia originally in the gas.) The cooling liquor is subject to distillation in two 285 to remove the ammonia therefrom and to obtain at line 295 a concentrated stream of ammonia and water vapor. Thereafter, the cooled gas is contacted in scrubbing space A of tower 1 (shown in Figure 1) with droplets of solution from sprays 4, 5 and 6 and the remaining ammonia is thereby removed from the gas. The solution to the scrubbing space is maintained in an acid condition and in an unsaturated condition with respect to ammonium sulfate content even after the absorption of the ammonia by the addition of sulfuric acid and water thereto as at inlet 14. The deammoniated gas then contacts heated droplets of solution from sprays 11, 12 and 13 and strips or evaporates moisture therefrom as well as from the solution from spray 17. The solution, due to this moisture removal becomes supersaturated and collects at reservoir R. This supersaturated solution is flowed to crystallizer 30 and passed upwardly through a bed or slurry of previously formed ammonium sulfate crystals H therein at the same time the concentrated stream of ammonia and water vapor from lines 295 and 32 is being applied thereto whereby the supersaturation of the solution io form crystals of ammonium sulfate of desirable size. These crystals are removed from bed H by way of suction nozzles 35. The supernatant liquid is flowed through line 40 and heater 44 to sprays 11, 12 and 13.

Figure 3:
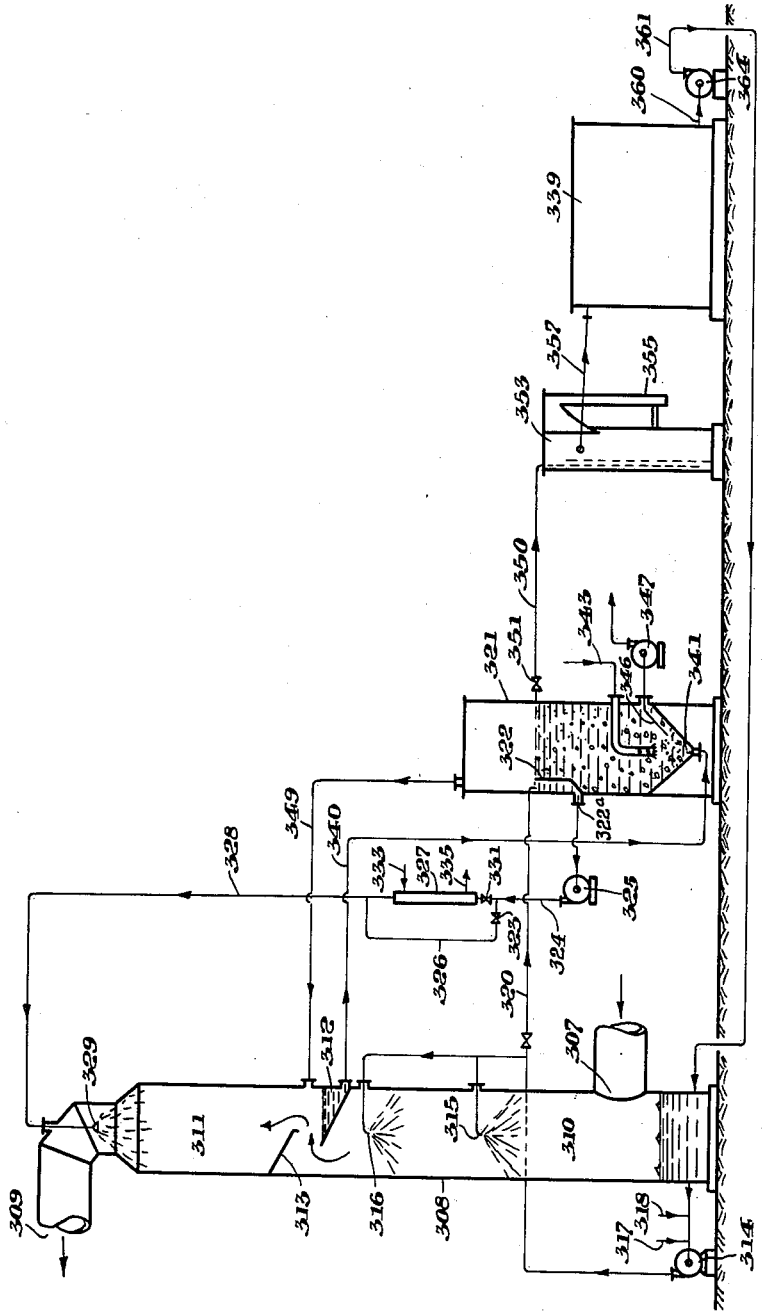
Figure 3 illustrates schematically another embodiment of the apparatus shown in Figure 1.

Figure 3 illustrates another embodiment of the invention. As in Figure 1, coke oven gas, after cooling and tar removal, enters at inlet 307 at the lower part of a tower 308, exits at outlet 309, and may then pass to a conventional separator (not shown) as in Figure 1. Baffles 312 and 313 divide the tower 308 into a scrubbing section 310 and an evaporating section 311. A pump 314 forces a major portion of the liquid from the bottom of scrubbing section 310 to spray units 315 and 316 which provide a dense concentration of spray droplets of the solution in the scrubbing section. The addition of sulfuric acid at line 317 and water at line 318 maintains the solution in scrubber 310 in an acidic condition and unsaturated with respect to its content of ammonium sulfate at all times. Pump 314 also forces a minor portion, about one percent, of the solution through line 320 to an outlet connection from the crystallizer 321, set apart by baffle 322 which prevents mixing of this unsaturated solution with the other solution in the crystallizer 321. The minor portion of solution from the scrubbing zone 310 and the solution from the outlet connection 322a of the crystallizer 321 flows through pump 325, line 324 and a conventional heater 327 to the line 328 which feeds a spray 329 in the evaporation section 311; the relative proportion of the solution flowing through line 326 and heater 327 being controlled by valves 323 and 331. The heater 327 may be of a conventional type having steam inlet 333 and an outlet 335.

As the heated droplets of liquid from spray 329 fall through evaporating zone 311 heat the deammoniated gas passing therethrough, and, as a result, the gas removes moisture from these droplets so that the solution becomes supersaturated. The droplets collect on baffle 313 and flow to baffle 312 or collect on baffle 312. The supersaturated solution then flows through line 340 to the lower conical inlet 341 of crystallizer 321 and upwardly through a bed of previously formed crystals therein. The supersaturation of the supersaturated solution is release by deposition of ammonium sulfate on the crystals at the same time ammonia from the ammonia still such as still 285 of Figure 2 is applied by way of line 343 to the crystals bed. Crystals of desirable size are removed by a suitable suction head 346 and by way of pump 347 sent to a suitable filter (not shown); the supernatant liquid and crystals are pumped by way of heater 327 to spray 329; and any gas not absorbed in the solution in crystallizer 321 is vented by line 349 to the evaporator section 311 of tower 308. Convection caused by the flow of solution and gas into the crystallizer is usually sufficient to prevent localized reaction of the ammonia or settling of the crystals. However, if desired, a conventional agitator may be provided to circulate the solution and crystals in the crystallizer.

In the event that it becomes necessary to "kill" the operation, that is to add water to dissolve any crystal encrustations that may have formed in the evaporating or crystallizing zones, line 350 with a valve 351 therein is provided for overflowing solution from crystallizer 321 to a conventional type tar separator 353. The tar compounds are discharged from this separator by way of line 355; and the ammonium sulfate solution flowed from the tar separator 353 through line 357 to storage tank 339. By way of lines 360 and 361 and pump 364, solution as needed from the storage tank 339 may be pumped back to the lower portion of the scrubbing zone 310.

Figure 4:
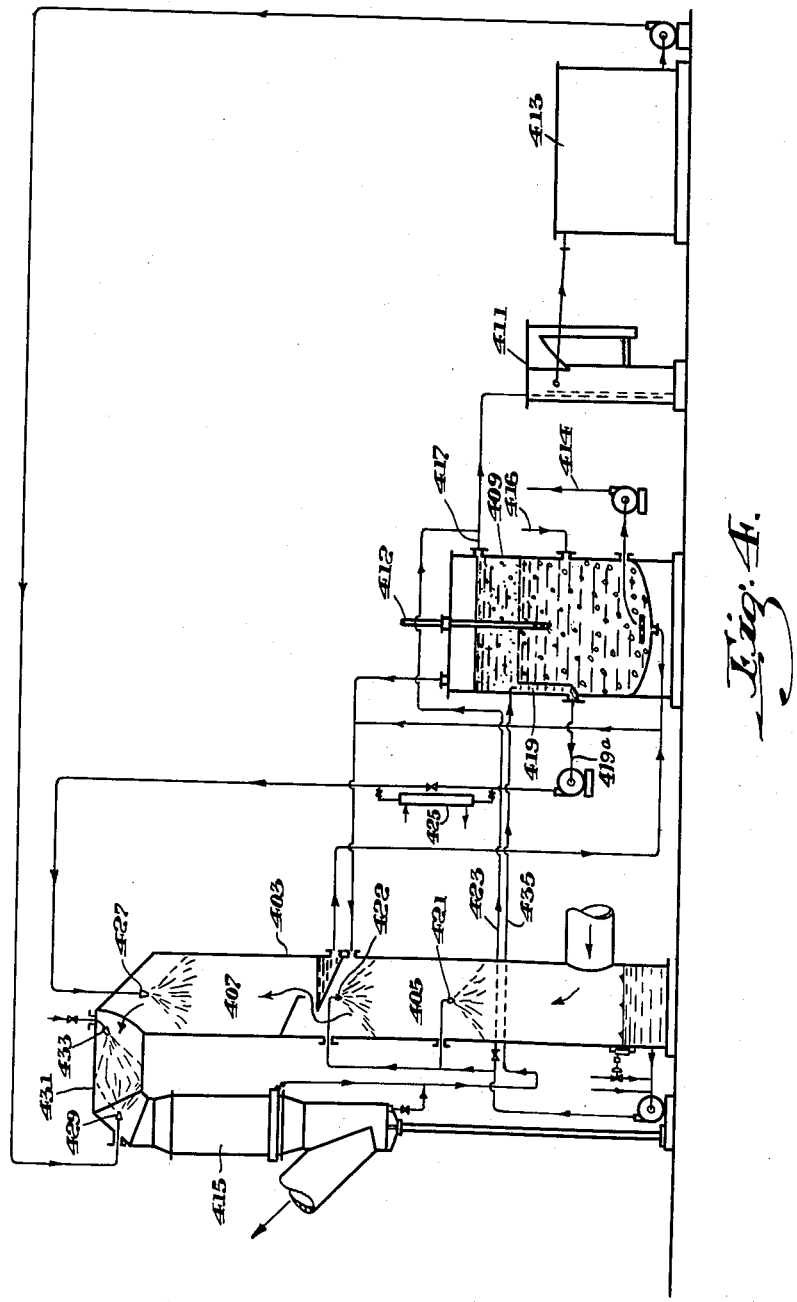
Figure 4 illustrates schematically a further embodiment of the invention.

Figure 4 illustrates a further embodiment of the invention utilizing a tower 403 having a scrubbing zone 405 and evaporating zone 407 similar to that of Figure 3, a crystallizer 409, a tar skimmer 411, a mother liquor tank 413 and an acid separator 415 of a conventional type. The crystallizer of Figure 4 has a feed line 412 for ammonia vapor, a line 414 for the withdrawal of crystals and a line 416 for return of the solution removed from the crystals and wash liquor from the crystals. This crystallizer differs from the crystallizer of Figure 3 in that the overflow line 417 is continuous and is at a position higher than the lead-off conduit 419 thereby providing for an intense stratification of crystals below the lead-off conduit due to the relatively great flow in the lower zone as compared with the small flow in the upper zone. Thus, crystals which flow through line 417 to tar skimmer 411 are relatively small crystals. The solution then flows to mother liquor tank 413.

In accordance with the embodiment of Figure 4, a major portion of the solution from the bottom of the tower 403 is pumped to the two sprays 421 and 422 for the scrubbing section and a minor portion is pumped by way of line 423 into the overflow to tar skimmer 411. The advantage of commingling this minor portion of the unsaturated solution with a smaller portion of overflow from crystallizer 409 tends to dissolve the crystals in the overflow solution and thereby provides maximum benefit of the dissolving action of the unsaturated solution.

The saturated solution from the crystallizer is heated by heater 425 and pumped to the spray 427 which showers the evaporating zone with solution. The unsaturated solution from the mother liquor tank 413 is pumped to a spray 429 and sprayed into conduit 431 leading to the acid separator so as to tend to knock out any saturated material and to prevent a build up of undesirable rock salt crystals in the conduit or separator. To further aid in this action, if desired, water may be added at intervals to the conduit through spray 433. Solution drains from the acid separator through line 435 by way of the lead-off conduit 419a to the inlet of the pump which forces solution to spray 427 in the evaporating section.

It is to be realized that the apparatus schematically illustrated herein is not drawn to scale. For example, the tower including the scrubbing and evaporating zones of a typical system in accordance with this invention may have a diameter of about 7 feet and a height of about 45 feet and the crystallizer may have a diameter of about 11 feet and a height of about 20 feet. In the operation of such equipment 2,080,000 standard cubic feet of gas per hour carrying about 927 pounds of ammonia vapor and 4600 pounds of water vapor, may be fed into the scrubbing zone. The gas leaves the outlet of the evaporating zone with about 15,000 pounds of water vapor. The gas enters at a temperature of about 103° F. and leaves at a temperature of about 136° F. To maintain the solution in the scrubbing zone in an acidified and unsaturated condition, about 3400 pounds of sulfuric acid and 7520 pounds of water are added every hour. The pump connecting the bottom of this scrubbing zone with the sprays may handle about 1200 gallons per minute of which about 20 gallons per minute may be sent to the evaporating zone. At this rate, about 395,000 gallons per hour of supersaturated solution flows from the evaporating zone to the crystallizing zone at the same time as about 253 pounds of ammonia and 1000 pounds per hour of water vapor enter the crystallizer as the concentrated stream of ammonia vapor from the ammonia still. About 4580 pounds of ammonium sulfate crystals are produced per hour. These crystals are washed and about 550 pounds of wash water is returned to the crystallizing tank per hour; also an equivalent of about 1300 pounds of water which has been used for the "kill" operation is evaporated per hour. About 396,000 gallons per hour of liquor heated to a temperature of about 135° F. is recycled from the crystallizing tank to the evaporating zone.

The foregoing has presented several embodiments of apparatus for carrying out a novel process for the recovery of ammonia from coke oven gas as desirable sized crystals of ammonium sulfate. The separation of the scrubbing stage from the evaporating stage has the advantages of maintaining the scrubbing solution in an unsaturated condition with respect to the ammonium sulfate content thereof and hence maintaining the solution in an efficient condition for the removal of the ammonia from the gas and of making the most effective use of the scrubbing and evaporating spaces. When these stages were separated heretofore, it had been necessary to use vacuum evaporation or other expensive means to remove the moisture from the solution whereas in accordance with the invention, the heat of the coke oven gas in conjunction with the heat added to the solution recycled from the crystallizer efficiently and economically removes the moisture from the solution. Further, the separation of the scrubbing, evaporating and crystallizing zones, in accordance with this invention, minimizes the locations in which undesirable crystal build-up is possible. In one embodiment, unsaturated solution is added to the evaporating zone in a manner to eliminate carry-over of saturated solution with the gas leaving the evaporating zone and to wash the walls of the evaporating zone, thereby decreasing the tendency of crystals to precipitate on the walls.

Although several embodiments of the invention have been illustrated and described in detail, it is to be understood that the invention is not limited thereto. Various changes can be made in the design and arrangement of the parts without departing from the spirit and scope of the invention as will now be understood by those skilled in the art.

What is claimed is:

1. A process for recovering the ammonia from coke oven gas as large crystals of ammonium sulfate which comprises contacting the gas in a scrubbing zone with a solution which contains sulfuric acid and is unsaturated as to its concentration of ammonium sulfate to absorb substantially all of the ammonia from said gas, thereafter contacting said substantially ammonia free gas in an evaporating zone with a heated solution of ammonium sulfate to remove water from said heated solution to increase the concentration of ammonium sulfate therein so that said solution reaches a supersaturated condition, then contacting said supersaturated solution in a crystallizing zone with previously formed crystals of ammonium sulfate in the presence of free ammonia to release the supersaturation of the solution by deposition on said crystals, removing the solution so desupersaturated from said crystallizing zone, and heating and returning the latter solution to said evaporating zone at said heated solution.

2. The process of claim 1 wherein the concentration of said heated ammonium sulfate in said evaporating zone is controlled by the addition of a quantity of said first named solution which contains sulphuric acid and is unsaturated as to its concentration of ammonium sulfate to said evaporating zone.

3. The process of claim 1 wherein the first named solution which contains sulphuric acid and is unsaturated as to its concentration of ammonium sulfate is maintained in an acidified and unsaturated condition in the scrubbing zone at all times by the addition of acid and water thereto.

4. A process for the recovery of ammonia from coke oven gas which comprises absorbing the ammonia from said gas with an aqueous sulphuric acid solution in a first stage, evaporating the moisture from said solution in a second stage whereby the solution reaches a state of supersaturation with respect to the ammonia salt of said sulphuric acid, and contacting said supersaturated solution in a third stage with a bed of previously formed crystals of said sulphuric acid salt while at the same time adding ammonia thereto.

5. In a process for removing the ammonia from coke oven gas, the improvement which comprises contacting said gas with a sulphuric acid solution to absorb the ammonia therein as a compound and thereafter contacting said gas with said solution at a higher temperature to increase the concentration of said compound in said solution through the stripping action of the gas from the first stage due to the dew point of the gas from the first stage being lower than the temperature of the solution in the second stage.

6. A process for the recovery of ammonia from coke oven gas which comprises removing a minor portion of the ammonia from said gas with water whereby a major portion of ammonia remains in the gas, removing the minor portion of said ammonia from said water as concentrated ammonia vapor, passing the gas with the major portion of ammonia therein in contact with an aqueous sulphuric acid solution whereby the ammonia is absorbed from said gas into said solution as a salt of said acid, thereafter contacting said solution with said gas to evaporate moisture from said solution and bring the solution to a supersaturated condition with respect to said salt, and contacting said supersaturated solution and said ammonia vapor simultaneously with a bed of previously formed crystals of said salt to produce crystals of large size.

7. Apparatus for recovering the ammonia from coke oven gas as crystals of ammonium sulfate comprising a tower having a lower gas inlet and an upper gas outlet for the passage of gas through the tower, means dividing said tower into two sections including a first baffle at an intermediate portion of said tower extending to about the mid point of the tower and a second baffle spaced below said first baffle and extending past said first baffle whereby solution can drain from said first baffle to said second baffle and whereby gas can flow between said baffles, spray means in the lower portion of said tower for spraying a solution of sulfuric acid into the gas passing therethrough, whereby said solution absorbs the ammonia from said gas, means in the upper portion of said tower for contacting a hot solution of ammonium sulfate with said gas whereby water is evaporated from the solution into said gas, means for circulating liquid from the bottom of said tower to said last named means and to said spray means, means for flowing solution from said second baffle to a second vessel, said second vessel constituting a crystallizer and having a bed of previously formed ammonium sulfate crystals therein, means for venting said second vessel to the upper section of said tower, means for adding ammonia to said second vessel, means for decanting solution from said second vessel and means for heating and returning the latter solution to said tower as said heated solution.

8. A process for recovering the ammonia from coke oven gas as large crystals of ammonium sulfate which comprises contacting the gas in a scrubbing zone with a solution which contains sulfuric acid and is unsaturated as to its concentration of ammonium sulfate to absorb substantially all of the ammonia from said gas, thereafter contacting said substantially ammonia free gas in an evaporating zone with a heated solution of ammonium sulfate to remove water from said heated solution to increase the concentration of ammonium sulfate therein so that said solution reaches a super-saturated condition, then contacting said supersaturated solution in a crystallizing zone with previously formed crystals of ammonium sulfate to release the supersaturation of the solution by deposition on said crystals, removing the solution so desupersaturated from said crystallizing zone, and heating and returning the latter solution to said evaporating zone as said heated solution.

9. A process for the recovery of ammonia from coke oven gas which comprises contacting the gas with droplets of an aqueous sulphuric acid solution in a first stage to remove the ammonia from said gas, and thereafter contacting said gas with heated droplets of said solution with the ammonia absorbed therein in a second stage to remove the moisture from said droplets.

10. The process of claim 9 wherein the gas is contacted with solution in said second stage at a rate of flow of solution about five times as great as the rate of flow of solution in said first stage.

11. The process of claim 9 wherein the first named droplets are fine droplets and the second named droplets are coarse droplets.

12. A process for recovering the ammonia from a coke oven gas as crystals of ammonium sulfate comprising the steps of separating in aqueous solution part of the ammonia from the gas and distilling the solution to obtain a concentrated stream of ammonia and water vapor, thereafter absorbing the rest of the ammonia from the gas in an aqueous sulfuric acid solution unsaturated with respect to its content of ammonium sulfate, evaporating moisture from the latter solution to supersaturate the solution with respect to its content of ammonium sulfate, and passing this supersaturated solution through a slurry of ammonium sulfate crystals to desupersaturate the solution by further crystal formation while simultaneously introducing said concentrated stream into said slurry so as to absorb the ammonia therefrom and precipitate it as ammonium sulfate on the crystals of said slurry.

References Cited in the file of this patent

UNITED STATES PATENTS

| | | |
|---|---|---|
| 2,025,059 | Kermer | Dec. 24, 1935 |
| 2,375,922 | Jeremiassen | May 15, 1945 |
| 2,383,171 | Tiddy | Aug. 21, 1945 |
| 2,599,067 | Otto | June 3, 1952 |

FOREIGN PATENTS

| | | |
|---|---|---|
| 542,493 | Great Britain | Jan. 12, 1942 |

UNITED STATES PATENT OFFICE
CERTIFICATION OF CORRECTION

Patent No. 2,966,394                December 27, 1960

Joseph Van Ackeren

It is hereby certified that error appears in the above numbered patent requiring correction and that the said Letters Patent should read as corrected below.

Column 8, line 22, after "sulfate" insert -- solution --

Signed and sealed this 13th day of June 1961.

(SEAL)
Attest:

ERNEST W. SWIDER
Attesting Officer

DAVID L. LADD
Commissioner of Patents